United States Patent [19]

Ako et al.

[11] Patent Number: 4,737,524

[45] Date of Patent: Apr. 12, 1988

[54] PROCESS FOR PRODUCING ASPHALT-BLENDED POLYURETHANE FOAMS

[75] Inventors: Masayuki Ako, Tokyo; Masafumi Dobashi, Kanagawa; Hiroya Fukuda; Takashi Ohashi, both of Yokohama, all of Japan

[73] Assignee: Bridgestone Corporation, Tokyo, Japan

[21] Appl. No.: 945,512

[22] Filed: Dec. 23, 1986

[30] Foreign Application Priority Data

Jul. 15, 1986 [JP] Japan .................................. 61-166310

[51] Int. Cl.$^4$ ............................................. C08J 9/00
[52] U.S. Cl. ........................................ 521/101; 521/83
[58] Field of Search .................................. 521/101, 83

[56] References Cited

U.S. PATENT DOCUMENTS

| | | | |
|---|---|---|---|
| 4,255,527 | 3/1981 | Roy | 521/101 |
| 4,255,678 | 9/1980 | Roy | 521/101 |
| 4,256,198 | 3/1981 | Kawakami et al. | 521/101 |
| 4,264,743 | 4/1981 | Maruyama et al. | 521/101 |

*Primary Examiner*—Morton Foelak
*Attorney, Agent, or Firm*—Birch, Stewart, Kolasch & Birch

[57] ABSTRACT

A process for producing asphalt-blended polyurethane foams which comprises introducing starting foaming materials for polyurethane foams containing a polyoxyalkylene polyol and an organic isocyanate either as respective individual ingredients or as a prepolymer into an agitation mixing chamber of a foaming apparatus, while introducing a previously heated and melted asphalt into the agitation mixing chamber of the foaming apparatus, mixing the starting foaming material for the polyurethane foams and the heated and melted asphalt and then foaming them. Asphalt-blended polyurethane foams can be obtained simply and efficiently and they are excellent in general physical properties, sound-/vibration characteristics and are suitable as sealing materials and sound-proofing or vibration-damping materials.

10 Claims, 1 Drawing Sheet

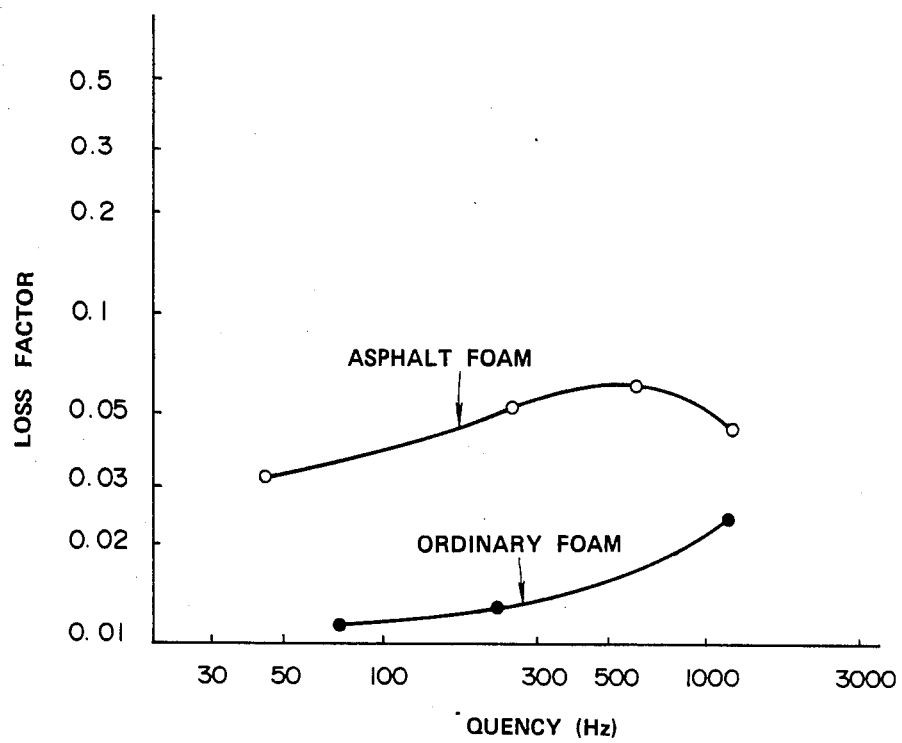

4,737,524

PROCESS FOR PRODUCING ASPHALT-BLENDED POLYURETHANE FOAMS

BACKGROUND OF THE INVENTION

1. Field of the Invention

This invention concerns a novel process for producing asphalt-blended polyurethane foams suitably used for sealing materials, sound-proofing or vibration-damping materials, etc.

2. Description of the Prior Art

Asphalt-blended polyurethane foams have hitherto been used as sealing materials for use in vehicles and in civil engineering, as well as sound-proofing or vibration-damping materials for use in vehicles and in general industries.

As the process for producing asphalt-blended polyurethane foams, there have been known the following processes:

(1) A process of melting and impregnating asphalts into flexible polyurethane foams having interconnected open cells, a process of impregnating an aqueous asphalt emulsion into flexible polyurethane foams followed by drying and, further, a process of impregnating an asphalt solution dissolved in a solvent into flexible polyurethane foams followed by drying (hereinafter referred to as "impregnation process"), (2) a process of preparing a urethane prepolymer by reacting a hydrophilic polyester polyol having an ethylene oxide content of greater than 15% with an organic isocyanate and then reacting to foam the prepolymer with an aqueous asphalt emulsion (hereinafter referred to as "foaming process A"), and (3) a process of blending asphalts previously with polyols compatible with asphalts such as polybutadiene polyol or the like and then mixing an organic isocyanate and like other ingredients followed by foaming (hereinafter referred to as "foaming process B").

Asphalt-blended polyurethane foams having waterproofness and sound-proofing or vibration-damping properties derived from asphalts can be obtained to any of these production processes.

However, since the asphalts are impregnated in previously formed flexible polyurethane foams in the impregnation process (1), it requires two steps for the production process and higher production cost as compared with the foaming process, as well as the impregnated asphalts may leach under high temperature causing sticking or contamination.

In the foaming process A above, an aqueous asphalt emulsion has to be prepared separately upon production of the polyurethane foams to require troublesome procedures for the production of foams. In addition, since the aqueous asphalt emulsion is used, it is difficult to optionally control the density of polyurethane foams by using an identical prepolymer, which results in disadvantages in that the natures of the resultant foams can not be varied with ease. Further, in view of the compatibility between the aqueous asphalt emulsion and the polyether polyol upon foaming the polyether polyol, a highly hydrophilic polyether polyol having 15% or more of ethylene oxide content has to be used to impose a restriction on the type of usable polyols, as well as the resultant foams swell upon contact with water to worsen the dimensional stability.

Further, the foaming process B is not practical since the resultant foams are expensive because of the use of a special polyol and because it can not attain the purpose of reducing the cost which is the merit of compositing the asphalts.

Moreover, although there have been proposed various attempts for producing asphalt-blended polyurethane foams comprising conventional polyurethane foams and asphalts composited thereto by means of the foaming process, since the polyoxyalkylene polyol and the asphalt as the main starting material for the conventional polyurethane foams are not compatible with but separated from each other, there have been few successful examples.

In view of the above, the present inventors have noticed that asphalts are compatible with organic isocyanates and already proposed a production process by forming a prepolymer through the reaction of a polyoxyalkylene polyol and an organic isocyanate, dissolving and blending asphalts with the prepolymer and then mixing to react water and a crosslinker with the blend to effect foaming (refer to the Japanese Patent Laid-Open No. 91213/1986).

However, since the viscosity of the blend comprising the prepolymer and the asphalt increases along with the increase in the blending amount of the asphalt in this process, there is a limit to the amount of the asphalt that can be dissolved and, further, the blend comprising the prepolymer and the asphalt increases the viscosity with an elapse of time to render the foaming instable.

In view of the above, there has been a demand for the development of a novel production process capable of blending the asphalt in a great amount and stably capable of producing asphalt-blended polyurethane foams suitably used as the sealing materials or sound-proofing or vibration-damping materials easily at a high production efficiency.

SUMMARY OF THE INVENTION

This invention has been accomplished in order to satisfy the foregoing demand and it is an object thereof to provide a novel process for producing an asphalt-blended polyurethane foam excellent in the performance as sealing materials and sound-proofing or vibration-damping materials easily and at good production efficiency.

The present inventors have made an earnest study for the simple and stable mixing of asphalts into polyurethane foams and, as a result, has accomplished this invention based on the following findings. Since the petroleum type asphalts are not compatible with but separated from polyoxyalkylene polyols as the usual starting materials for the flexible polyurethane foams, it is impossible to mix and foam the asphalts in the polyols. Further, since the asphalts are compatible with organic isocyanates, although they can be dissolved to foam in the isocynates, the amount of the organic isocyanate used is smaller relative to that of the polyoxyalkylene polyols and, accordingly, the amount of the soluble asphalt is smaller relative to the amount of the final flexible polyurethane foam, thus failing to obtain foams suitable as sealing materials and sound-proofing or vibration-damping materials. However, upon producing flexible polyurethane foams by introducing starting materials for the production of polyurethane foams such as polyoxyalkylene polyol, organic isocyanate, water, catalyst and foam conditioning agent into an agitation mixing chamber of a foaming apparatus and mixing these starting materials followed by foaming, if previously heated and melted asphalt is introduced into the agitation mixing chamber of the foaming apparatus, the starting materials for the production of the polyurethane foams described above and the asphalt are forcibly agitated and kneaded in which the starting materials for the production of the polyurethane foams and the asphalt are compatibilized with no separation from each other and asphalt-blended polyurethane foams at high quality in which asphalts are homogeneously mixed in polyurethane foams can be obtained by foaming them. In addition, if a great amount of asphalt is blended, asphalt-blended polyurethane foams suitable to the sealing material and sound-proofing or vibration-damping materials excellent in general physical properties and sound-proofing or vibration-damping can be produced easily at a high production efficiency with no increase in the viscosity of the mixture or undergoing no instable foaming caused by the aging increase in the viscosity.

Accordingly, this invention provides a process for producing asphalt-blended polyurethane foams which comprises introducing foaming starting materials for polyurethane foams containing a polyoxyalkylene polyol and an organic isocyanate either respectively as individual ingredients or as a prepolymer into an agitation mixing chamber of a foaming apparatus, while introducing previously heated and melted asphalt into the agitation mixing chamber of the foaming apparatus, mixing the foaming starting materials for the polyurethane foams and the heated and melted asphalt and then foaming them.

By the above-described production process according to this invention, since the starting materials for the production of the polyurethane foams and the asphalt are compatibilized with each other without separation from each other and a greater amount of asphalt can be blended, asphalt-blended polyurethane foams excellent in general physical properties, sound-proofing, or vibration-damping, etc. and suitable as the sealing materials and sound-proofing or vibration-damping materials can be produced easily and at a good producing efficiency.

BRIEF DESCRIPTION OF THE ACCOMPANYING DRAWING

The above and other objects, features and advantages of the invention will become more apparent from the following description and claims taken in conjunction with the accompanying drawings, in which:

The drawing is a graph illustrating the sound-proofing and vibration-damping for one example of asphalt-blended polyurethane foams produced by the process according to this invention.

DETAILED DESCRIPTION OF PREFERRED EMBODIMENTS

The production process for asphalt-blended polyurethane foams according to this invention, uses polyoxyalkylene polyols and an organic isocyanate and, further, water, catalyst and a foam conditioning agent as the starting materials for the production of the polyurethane foams.

The polyoxyalkylene polyol usable in this invention may be those polyoxyalkylene polyols usually used in the production of polyurethane foams and they can include, specifically, addition polymerizates of alkylene oxide such as ethylene oxide, propylene oxide and butylene oxide, alone, or in combination of two or more of them with a polyhydric alcohol such as ethylene glycol, propylene glycol, glycerin, trimethylol propane and pentaerythritol. These polyoxyalkylene polyols may be used alone or as a mixture of two or more of them. Further, although there are no particular restrictions to the organic isocyanates usable in this invention, aliphatic or aromatic polyisocyanate containing two or more isocyanate groups in the molecule and mixtures thereof and the modification products thereof are preferred. Specifically, the aliphatic isocyanate can include, for example, hexamethylene diisocyanate, isophorone diisocyanate and methylcyclohexane diisocyanate, while the aromatic isocyanate can include, for example, tolylenediisocyanate (2,4- and/or 2,6-isomers), diphenylmethane diisocyanate, naphthalene diisocyanate, polyvalent polyisocyanate prepared through the reaction of low polycondensate of aniline and formaldehyde with phosgen. Among the polyisocyanates, those comprising tolylene diisocyanate in an isomer ratio, that is, 2,4-/2,6-isomer mixing ratio between 80:20 and 65:35 by weight are preferably used since they are highly useful and easily available at a reduced cost. These organic isocyanates may be used either alone or in a combination of two or more of them.

In this case, the polyoxyalkylene polyol and the organic isocyanate as described above may be blended respectively as individual ingredients but, if required, the polyoxyalkylene polyol and the organic isocyanate may be reacted into a prepolymer, which is then blended with other ingredients.

The blending amount of the organic isocyanate can usually be from 20 to 80 parts by weight based on 100 parts by weight of the polyoxyalkylene polyol.

Further, water blended as the starting material for the production of the polyurethane foams functions as a blowing agent that reacts with the organic isocyanate to evolve carbon dioxide. While the blending amount may be selected broadly depending on the determination for the density of the final foams, it is, preferably, from 1 to 5 parts by weight based on 100 parts by weight of the polyoxyalkylene polyol. In this case, a volatiling solvent such as freon or the like may be blended in addition to water as a subsidiary blowing agent to improve the effect.

Further, although the catalyst and the foam controlling agent used as the starting material for the production of the polyurethane foams are not limited, there are preferably used various types of amines and tin catalysts as the catalyst and silicone type surface active agents and the likes as the foam controlling agent. By blending these catalyst and the foam controlling agent satisfactory polyurethane foams can be obtained. In this case, although there is no particular restrictions for the blending amount of the catalyst and the foam conditioning agent, it is preferred to blend the catalyst from 0.1 to 1 part by weight and the foam conditioning agent from 5 to 20 parts by weight based on 100 parts by weight of the polyoxyalkylene polyol.

As the starting materials for the production of the polyurethane foams those fillers such as calcium carbonate, barium sulfate, kaolin, clay and talc can be added as required in addition to the ingredients as described above and, further, polyfunctional crosslinkers such as ethylene glycol, propylene glycol, glycerin and trimethylol propane may be added to control the foaming stability and the hardness of the final foams.

In the production process according to this invention, the starting material for the production of the polyurethane foams and the previously heated and melted asphalt as described above are respectively introduced into an agitation mixing chamber of a foaming apparatus, mixed and then foamed.

The asphalt used in this invention is selected broadly depending on the purpose of use of the foams and, it is possible to use those asphalts, for example, straight asphalt obtained as the residue after distilling off asphalt-based crude oils, blown asphalt prepared by blowing air to the above-mentioned asphalt for oxidizing polymerization and so-called cutback asphalt prepared by mixing a solvent to these various kinds of asphalt for reducing the viscosity. Since the asphalts with higher degree of penetration can be handled more easily, it is preferred to use those having the penetration degree higher than 60. If the penetration degree of the asphalt is too low, high temperature heating is required for obtaining flowability and it may possibly result in difficulty of the reaction control upon foaming.

The amount of blending of these asphalts can be from 5 to 200 parts by weight based on 100 parts by weight of the polyoxyalkylene polyol and a great amount of asphalt can be blended in this invention. Particularly, it is preferred to define the blending amount from 80 to 120 parts by weight for obtaining foams sufficient in general physical properties such as elongation.

In this case, asphalt is previously heated and melted and then introduced into the agitation mixing chamber of the foaming machine. While there are no particular restrictions for the temperature upon feeding the molten asphalt and it varies generally depending on the penetration degree and the softening point of the asphalt used, a temperature at 100°-120° C. is preferred in that the asphalt possesses a sufficient flowability upon feeding the molten asphalt and maintains the balance in the chemical reaction upon growing of the foams.

The production process according to this invention comprises, as described above, upon introducing to mix starting materials for the production of the polyurethane foams into the agitation mixing chamber of the foaming machine, previously heated and melted asphalt is introduced into the agitation mixing chamber of the foaming machine, the starting material for the production of polyurethane foams and the asphalt are forcedly agitated to mix in the mixing chamber, followed by foaming. In this way, by heating to melt the asphalt and introducing into the agitation mixing chamber of the foaming apparatus, the starting material for the production of the polyurethane foams and the asphalts are mechanically agitated to mix forcibly and they are easily compatibilized with each other with no separation from each other. Further, if a great amount of asphalt is blended, asphalt-blended polyurethane foams of excellent quality can be obtained without increasing the viscosity and without impairing the forming stability due to the aging increase in the viscosity.

This invention will now be described more specifically referring to examples and comparative examples, but it should be noted that this invention is no way limited only to the following examples.

EXAMPLE 1

A trifunctional polyol having a molecular weight of 3000 prepared by adding propylene oxide to starting glycerin as the first ingredient, an isocyanate as the second ingredient, water, amine catalyst, crosslinker and silicone type surface active agent as the third ingredients and a tin catalyst diluted with dioctylphosphate (DOP) as the fourth ingredient were used and introduced quantitatively at a blending ratio shown in Table 1 into an agitation mixing chamber of a foaming apparatus. Further, straight asphalt (penetration degree: 60-80) heated and melted at 100° C. in the same amount as the total sum of the first ingredient and the second ingredient as described above were introduced as the fifth ingredient in a separate stream into the agitation mixing chamber of the foaming apparatus and these ingredients were mixed and discharged. The discharged liquid mixture turned creaming after five seconds, foamed subsequently and, after 2 minutes, the foaming was completed to foam asphalt-blended flexible polyurethane foams.

The general physical properties of the asphalt-blended polyurethane foams as shown in Table 2, and they had favorable quality.

TABLE 1

| | Ingredient | | | Blending amount (wt %) |
|---|---|---|---|---|
| First ingredient | Polyol | Glycerin-based propylene oxide addition: molecular weight 3000, trifunctional | — | 100 |
| Second ingredient | Organic isocyanate | TDI (Colonate-T.80) | Nippon Polyurethane Co. | 33.4 |
| Third ingredient | Water | — | — | 2.0 |
| | Amine catalyst | DABCO | Sankyo Air Product Co. | 1.0 |
| | Silicone surfactant | L-520 | Nippon Unichika Co. | 1.0 |
| | Crosslinker | 1,4-butandiol | Toyo Soda Co. | 2.0 |
| Fourth ingredient | Tin catalyst | Stannous Octoate | Yoshitomi Seiyaku Co. | 0.3 |
| | Dilution liquid | DOP | Mitsubishi Monsanto Kasei Co. | 0.9 |
| Fifth ingredient | Asphalt | Straight asphalt, penetration degree: 60-80 | Nippon Sekiyu | 130 |

TABLE 2

| General physical properties of asphalt foams | Measured value |
|---|---|
| Density (g/cm$^3$) | 0.06 |
| Elongation (%) | 160 |
| Tensile strength (kg/cm$^2$) | 1.0 |
| Air permeability* (cc/cm$^2$/sec) | 0.8 |

*Fragile type permeability tester used

COMPARATIVE EXAMPLE 1

It was tried to dissolve 100 parts by weight of heated and melted straight asphalt (penetration degree: 150-200) to 100 parts by weight of a trifunctional triol having a molecular weight of 3000 prepared by adding propylene oxide to the starting glycerin in the same manner as in Example 1. However, both of the ingredients were not compatibilized with each other but separated into gel and did not foam.

Further, although similar processes were also tried by replacing the starting materials for the polyol with ethylene glycol, propylene glycol or trimethylol propane, or adding ethylene oxide instead of propylene oxide, or changing the molecular weight of the polyol from 2000 to 7000, it was found that they foamed neither.

EXAMPLE 2

Asphalt-blended polyurethane foams were obtained by the prepolymer process by using the same ingredients as those in Example 1. That is, a prepolymer having terminal NCO groups was prepared by previously reacting the first ingredient and the second ingredient, which was then introduced to an agitation mixing chamber of a foaming apparatus, then, the third and the fourth ingredients and the heated and melted asphalt as the fifth ingredient were introduced into the agitation mixing chamber of the foaming apparatus and these ingredients were mixed to foam in the same manners as in Example 1.

Although the asphalt-blended polyurethane foams obtained in this example had lower air permeability than the asphalt foams in Example 1, they exhibited preferred physical properties as in Example 1.

COMPARATIVE EXAMPLE 2

Asphalt as the fifth ingredient was heated to melt and dissolved into the prepolymer prepared in the same manner as in Example 2, to which the third ingredient and the fourth ingredient were mixed and foamed in the same manner as in Example 1 to obtain asphalt-blended polyurethane foams.

Although the asphalt-blended polyurethane foams had preferable physical properties, after left as 40° C. for 24 hours, the viscosity was increased (to greater than 20,000 cP of viscosity) and they were no longer usable.

EXAMPLE 3

80 parts by weight of barium sulfate was added as the filler to 100 parts by weight of the same prepolymer as in Example 2 and, by the subsequent same procedures as in Example 2, asphalt-blended polyurethane foams were obtained.

When the sonic/vibration characteristic of the thus obtained asphalt-blended flexible polyurethane foams were measured by the mechanical impedance method under the following conditions, the asphalt-blended polyurethane foams were excellent in sound-proofing and vibration-damping characteristics as shown by the figures as compared with the ordinary flexible polyurethane foam prepared by the same procedure as the asphalt-blended polyurethane foam except that asphalt was not blended.

Mechanical Impedance Method

Indication at a middle point of a beam using an impedance head:

Temperature: 20° C.
Foam thickness: 10 mm
Iron plate thickness: 0.8 mm

What is claimed is:

1. A process for the production of an asphalt-blended flexible polyurethane foam which comprises:
    adding into an agitation mixing chamber of a foaming apparatus starting foaming materials consisting essentially of a polyoxyalkylene polyol which is not compatible with but separated from an asphalt, an organic isocyanate wherein said polyoxyalkylene polyol and said organic isocyanate are individual ingredients or in the form of a prepolymer, water, a catalyst, and a foam conditioning agent;
    introducing into said agitation mixing chamber melted asphalt;
    simultaneously mixing said starting forming materials with said melted asphalts; and
    foaming the resultant mixture.

2. The production process as defined in claim 1, wherein the asphalt is blended in an amount from 5 to 200 parts by weight based on 100 parts by weight of the polyoxyalkylene polyol.

3. The production process as defined in claim 2, wherein the asphalt is blended in an amount from 80 to 120 parts by weight based on 100 parts by weight of the polyoxyalkylene polyol.

4. The production process as defined in claim 1, wherein the asphalt used in the process is selected from straight asphalt, blown asphalt and cutback asphalt.

5. The production process as defined in claim 1, wherein the asphalt has the penetration degree greater than 60.

6. The production process as defined in claim 1, wherein the asphalt is supplied in a molten state at a temperature from 100° to 120° C.

7. A process according to claim 1, wherein said polyoxyalkylene polyol is selected from the group consisting of addition polymerizates of alkylene oxide, alone, or in combination with a polyhydric alcohol.

8. A process according to claim 7, wherein said polyoxyalkylene polyol is an addition polymerizate of ethylene oxide, propylene oxide, butylene oxide or mixtures thereof.

9. A process according to claim 7, wherein said polyoxyalkylene polyol is an addition polymerizate of an alkylene oxide and a polyhydric alcohol.

10. A process according to claim 9, wherein said polyhydric alcohol is selected from a group consisting of ethylene glycol, propylene glycol, glycerin, trimethylol propane and pentaerythritol.

* * * * *